United States Patent
Lockwood et al.

(10) Patent No.: US 8,463,493 B2
(45) Date of Patent: Jun. 11, 2013

(54) POWERTRAIN THERMAL CONTROL WITH GRILLE AIRFLOW SHUTTERS

(75) Inventors: Thomas K. Lockwood, Fenton, MI (US); Michael G. Leffert, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 608 days.

(21) Appl. No.: 12/752,418

(22) Filed: Apr. 1, 2010

(65) Prior Publication Data

US 2011/0246023 A1 Oct. 6, 2011

(51) Int. Cl.
*G06F 7/00* (2006.01)

(52) U.S. Cl.
USPC .......... 701/36; 180/68.1; 180/68.2; 180/68.4; 180/68.6

(58) Field of Classification Search
USPC ............. 701/36, 50, 101, 102, 103; 180/68.1, 180/68.2, 68.4, 68.6
See application file for complete search history.

(56) References Cited

U.S. PATENT DOCUMENTS

| | | | | |
|---|---|---|---|---|
| 6,588,380 | B2 * | 7/2003 | Ries-Mueller | 123/41.05 |
| 6,854,544 | B2 * | 2/2005 | Vide | 180/68.6 |
| 8,292,014 | B2 * | 10/2012 | Sugiyama | 180/68.1 |
| 2006/0095178 | A1 | 5/2006 | Guilfoyle et al. | |

FOREIGN PATENT DOCUMENTS

| | | |
|---|---|---|
| DE | 10019419 A1 | 10/2001 |
| DE | 102004028697 A1 | 1/2005 |
| DE | 102006062116 A1 | 6/2007 |
| DE | 102008020310 A1 | 10/2009 |
| EP | 0952315 A1 | 10/1999 |

* cited by examiner

*Primary Examiner* — Richard M. Camby

(57) ABSTRACT

A method of powertrain thermal control in a vehicle having grille airflow shutters. The method comprises the steps of: detecting vehicle operating conditions including at least a temperature condition for an engine cooling loop and engine load; pumping engine coolant through the engine cooling loop including pumping the engine coolant through a radiator under all temperature conditions of the engine cooling loop; and adjusting the grille airflow shutters relative to a grille to selectively block a portion, none or all airflow through the grille to thereby control airflow through the radiator based upon the detected vehicle operating conditions.

14 Claims, 2 Drawing Sheets

POWERTRAIN THERMAL CONTROL WITH GRILLE AIRFLOW SHUTTERS

BACKGROUND OF INVENTION

The present invention relates generally to front grilles on vehicles and more particularly to front grilles where the airflow through the grilles can be selectively blocked.

Grille airflow shutters have traditionally been used for the purpose of assuring that the airflow through the grille is reduced to an amount that minimizes the aerodynamic drag coefficient penalty for the vehicle. This is accomplished by managing airflow to the minimum required to meet air conditioning, powertrain cooling and under-hood thermal requirements. Adding this system to a vehicle, though, adds to the vehicle cost without removing other costs to the vehicle, so a cost penalty is incurred to improve the vehicle fuel economy, making grille airflow shutters less desirable to include on some vehicles.

SUMMARY OF INVENTION

An embodiment contemplates a method of powertrain thermal control in a vehicle having grille airflow shutters, the method comprising the steps of: detecting vehicle operating conditions including at least a temperature condition for an engine cooling loop and engine load; pumping engine coolant through the engine cooling loop including pumping the engine coolant through a radiator under all temperature conditions of the engine cooling loop; and adjusting the grille airflow shutters relative to a grille to selectively block a portion, none or all airflow through the grille to thereby control airflow through the radiator based upon the detected vehicle operating conditions.

An embodiment contemplates a method of powertrain thermal control in a vehicle having upper grille airflow shutters and lower grille airflow shutters, the method comprising the steps of: detecting vehicle operating conditions including at least a temperature condition for an engine cooling loop and engine load; pumping engine coolant through the engine cooling loop including pumping the engine coolant through a radiator under all temperature conditions of the engine cooling loop; and adjusting the lower grille airflow shutters relative to a lower grille to selectively block a portion, none or all airflow through the lower grille to thereby control airflow through the radiator based upon the detected vehicle operating conditions; detecting if an air conditioning system is operating; if the air conditioning system is operating, actuating the upper grille airflow shutters to allow most or all airflow through an upper grille; and if the air conditioning system is not operating, actuating the upper grille airflow shutters to block most or all airflow through the upper grille.

An advantage of an embodiment is that the grille airflow shutters can be employed not only to improve the vehicle fuel economy but also allow for the elimination of a thermostat valve in the engine cooling loop and a bypass valve in the transmission cooling loop thus reducing costs. The elimination of these devices also reduces the complexity of those cooling loops. Moreover, the shutters can be controlled to respond quickly to changes in vehicle operating conditions. The grille airflow shutters allow for transmission warming under light load, moderate ambient temperature conditions, while also allowing for adequate cooling under maximum load, high ambient temperature conditions. A second set of grille airflow shutters may be employed to improve the control of airflow through the grilles based on use or non-use of a vehicle air conditioning system.

DETAILED DESCRIPTION

Figure 1:
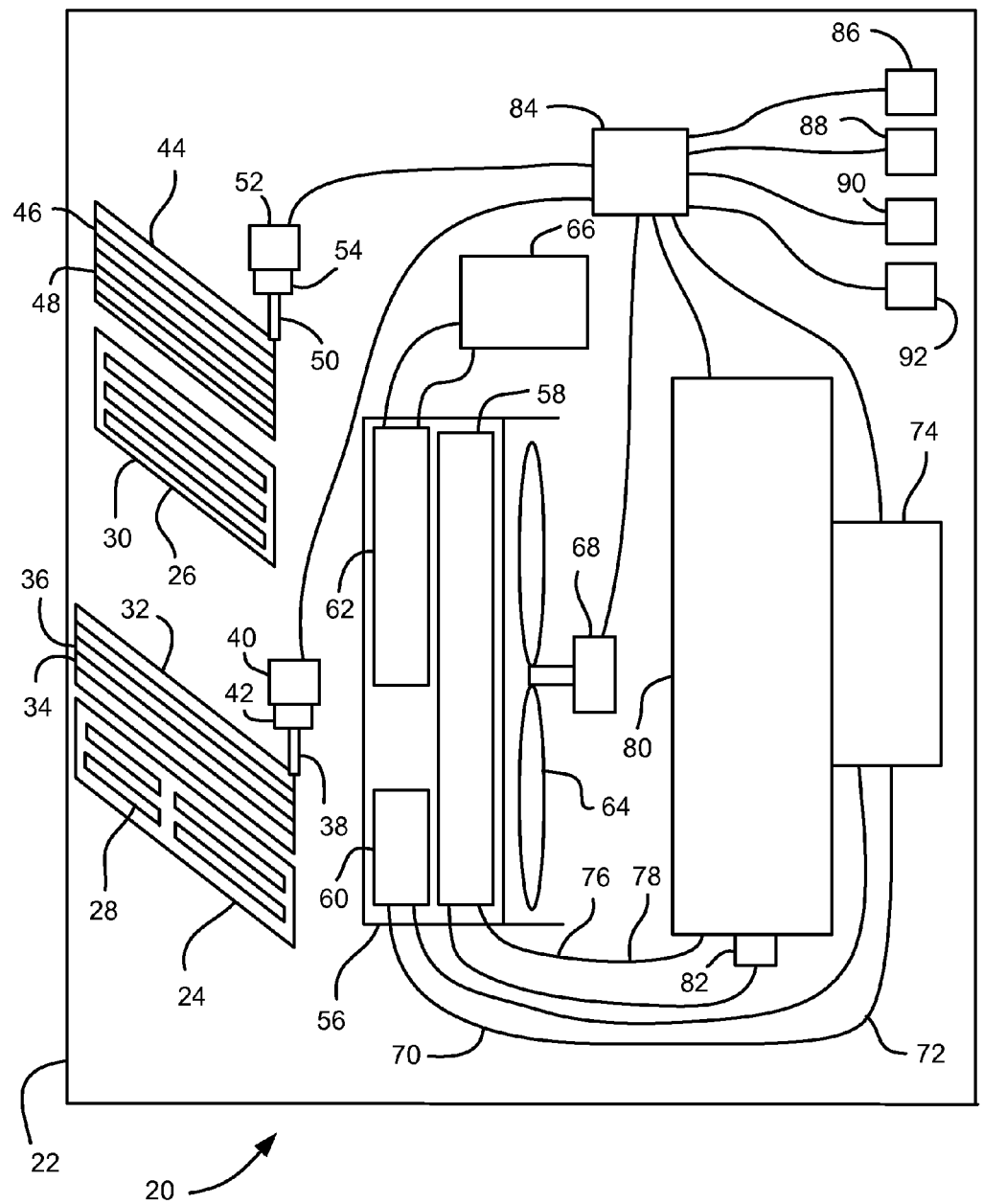
FIG. 1 is a schematic view of a portion of a vehicle having grille airflow shutters.

Referring to FIG. 1, a vehicle, indicated generally at 20, is shown. The vehicle 20 includes a front end 22 with a lower grill 24 and an upper grille 26 proximate the front end 22. Alternatively, the vehicle 20 may have only one grille, depending upon the particular styling of the vehicle. The lower grille 24 has openings 28 that allow airflow through, and the upper grille 26 also has openings 30 that allow airflow through.

Lower grille airflow shutters 32 are mounted adjacent to the lower grille 24 and include openings 34 sized and spaced to align with the openings 28 in the lower grille 24 to allow for maximum airflow in a first position of the lower shutters 32 and blocking members 36 that are sized and spaced to align with the openings 28 and block all or almost all of the airflow through the lower shutters 32 in a second position of the lower shutters 32. The movement of the lower shutters 32 between the first and second positions allow for partial blockage of the airflow. A lower actuator 38 is connected to a lower motor 40 via a lower gear box 42. The actuation of the lower motor 40 causes the lower actuator 38 to move the lower grille airflow shutters 32 relative to the lower grill 24 to precisely control the airflow blockage through the lower grill 24.

Upper grille airflow shutters 44 are mounted adjacent to the upper grille 26 and include openings 46 sized and spaced to align with the openings 30 in the upper grille 26 to allow for maximum airflow in a first position of the upper shutters 44 and blocking members 48 that are sized and spaced to align with the openings 30 and block all or almost all of the airflow through the upper shutters 44 in a second position of the upper shutters 44. The movement of the upper shutters 44 between the first and second positions allow for partial blockage of the airflow. An upper actuator 50 is connected to an upper motor 52 via an upper gear box 54. The actuation of the upper motor 52 causes the upper actuator 50 to move the upper grille airflow shutters 44 relative to the upper grill 26 to precisely control the airflow blockage through the upper grill 26.

In FIG. 1, the shutters 32, 44 are not shown directly behind the grilles 24, 26, respectively, for clarity in showing the shutters 32, 44. Also, while the shutters shown as move up and down linearly to selectively allow and block airflow, other types of shutter mechanisms may be employed instead if so desired. For example, the shutters may be configured to pivot or rotate relative to openings in the grilles. The shutters employed just need to be movable so that precise control of blockage of grille openings can be achieved in order to control airflow.

A condenser, radiator, fan module (CRFM) 56 is located behind the lower and upper grilles 24, 26 in order to receive airflow coming through the grille openings 28, 30. The CRFM 56 may include a radiator 58, another heat exchanger 60, a condenser 62 and an engine fan 64. The condenser 62 connects to and is part of an air conditioning system 66. The engine fan 64 may be driven by a fan motor 68. The other heat exchanger 60 may be, for example, a transmission oil cooler, a charge air cooler for a turbocharger/supercharger system or a powertrain electronics heat exchanger, In the particular example shown in FIG. 1, the heat exchanger shown is the transmission oil cooler.

The transmission oil cooler 60 is part of a transmission cooling loop 70 that includes transmission oil lines 72 that direct transmission oil between the transmission oil cooler 60 and a transmission 74. The term "transmission cooling loop" as used herein does not include a transmission oil cooler bypass or valve for bypassing the transmission oil cooler as the transmission oil flows through the transmission cooling loop.

The radiator 58 is part of an engine cooling loop 76 that includes engine coolant lines 78 that direct engine coolant between the radiator 58 and an engine 80. An engine coolant pump 82 pumps the engine coolant through the engine cooling loop 76. The pump 82 may be, for example, a pump with an electromagnetic clutch that is pulse controlled. This allows for significant control over the rate of engine coolant flow through the engine cooling loop. The term "engine cooling loop" as used herein does not include a thermostat valve for selectively bypassing the radiator as the engine coolant flows through the engine cooling loop.

An engine control module 84 interacts with and controls the lower motor 40, upper motor 52, fan motor 68, transmission 74, and engine 80. The engine control module 84 may be made up of a single controller or multiple interacting controllers, and may be any combination of hardware and software as is known to those skilled in the art. The engine control module 84 may also be in communication with other vehicle sensors, which may include, for example, a transmission oil temperature sensor 86, an engine coolant temperature sensor 88, an ambient air temperature sensor 90 and a vehicle speed sensor 92. The location and operation of these sensors are known to those skilled in the art and so will not be discussed herein. Other sensors and inputs to the engine control module 84 may be employed to determine the control of the shutters 32, 44 as well, if so desired.

Figure 2:
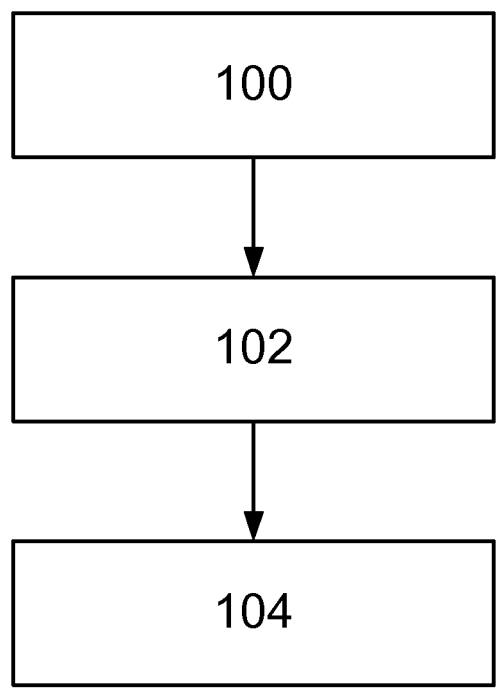
FIG. 2 is a flow chart showing a method of using grille airflow shutters for powertrain thermal control.

FIG. 2 illustrates a method of powertrain thermal control in the vehicle of FIG. 1. Vehicle operating conditions are detected, block 100. The operating conditions that may be monitored to determine the actuation of the grille airflow shutters 32, 44 may include a temperature reading from the engine cooling loop 76, the engine load, a temperature reading from the transmission cooling loop 70, the vehicle speed, ambient air temperature, operation of the air conditioning system. The engine load may be determined based on, for example, a throttle position, engine vacuum, or other conventional means of determining an engine load. Also, other operating conditions may be monitored and used to determine the actuation of the grille airflow shutters 32, 44, if so desired.

The engine coolant is pumped through the engine cooling loop 76, including pumping the engine coolant through the radiator 58, block 102. With a thermostat valve not present in the engine cooling loop 76, the engine coolant does not bypass the radiator 58 as it flows through the engine cooling loop 76. The rate of coolant flow through the system may be controlled by employing an engine coolant pump 82 that allows for variable flow, thus further improving the control over the engine cooling.

One or both of the grille airflow shutters 32, 44 are adjusted to selectively block a portion, none or all of the airflow through the grilles 24,26, block 104. The adjustment is based upon the vehicle operating conditions that were detected. The engine control module 84 receives the inputs from the various vehicle systems and determines the amount of desired airflow through the grilles 24, 26. The control module 84 then actuates the motors 40, 52 to cause the airflow shutters 32, 44 to move relative to the grilles 24, 26. The amount of overlap between the grille openings 34, 46 and their respective blocking members 36, 48 determines the amount of airflow that is blocked.

If the vehicle 20 is equipped with an air conditioning system 66 and has both the lower grille 24 and the upper grille 26, then the control of the upper grille airflow shutters 44 may be based primarily on whether the air conditioning system is operating or not.

As an example of the operation of this system, the vehicle 20 may be started in cool ambient temperature conditions where the engine coolant and the transmission fluid are both below their respective desired operating temperature ranges and the engine is operating under light load, such as when it is idling. Under this operating condition, the engine control module 84 may actuate the motors 40, 52 to move the grille airflow shutters 32, 44 so that all or almost all of the airflow is blocked from flowing through the grilles 24,26. Thus, both the engine coolant and the transmission fluid will warm faster to reach their desired operating temperatures without the need for a thermostat for radiator bypass or a bypass valve for the transmission oil cooler 60.

Under heavy load when the engine coolant and transmission fluid are within their desired temperature ranges, one or both of the grille airflow shutters 32, 44 may be adjusted to allow for a high rate of airflow through the grilles 24, 26. The engine fan 64 speed may also be controlled to coordinate with the adjustments of the grille airflow shutters 32, 44 to allow for greater precision and a wider range of airflow through the CRFM 56.

While certain embodiments of the present invention have been described in detail, those familiar with the art to which this invention relates will recognize various alternative designs and embodiments for practicing the invention as defined by the following claims.

What is claimed is:

1. A method of powertrain thermal control in a vehicle having grille airflow shutters, the method comprising the steps of:
    (a) detecting vehicle operating conditions including at least a temperature condition for an engine cooling loop and engine load;
    (b) pumping engine coolant through the engine cooling loop including pumping the engine coolant through a radiator under all temperature conditions of the engine cooling loop; and
    (c) adjusting the grille airflow shutters relative to a grille to selectively block a portion, none or all airflow through the grille to thereby control airflow through the radiator based upon the detected vehicle operating conditions; and
    wherein step (a) is further defined by the detected vehicle operating conditions including a temperature condition for a powertrain electronics heat exchanger, and step (c) is further defined by the grille airflow shutters selectively blocking airflow through the powertrain electronics heat exchanger.

2. The method of claim 1 wherein step (a) is further defined by the detected vehicle operating conditions including a temperature condition for a transmission cooling loop, and step (c) is further defined by the grille airflow shutters selectively blocking airflow through a transmission oil cooler.

3. The method of claim 2 comprising:
    (d) detecting if an air conditioning system is operating;
    (e) if the air conditioning system is operating, actuating an upper grille airflow shutter to allow most or all airflow through an upper grille; and (f) if the air conditioning system is not operating, actuating the upper grille airflow shutter to block most or all airflow through the upper grille.

4. The method of claim 1 comprising:
(d) detecting if an air conditioning system is operating;
(e) if the air conditioning system is operating, actuating an upper grille airflow shutter to allow most or all airflow through an upper grille; and
(f) if the air conditioning system is not operating, actuating the upper grille airflow shutter to block most or all airflow through the upper grille.

5. The method of claim 4 wherein step (b) is further defined by controlling a rate of flow pumped through the engine cooling loop by employing pulse control of an engine coolant pump.

6. The method of claim 1 wherein step (b) is further defined by controlling a rate of flow pumped through the engine cooling loop by employing pulse control of an engine coolant pump.

7. The method of claim 1 including step (d) ceasing operation of an engine fan if the grille airflow shutters are adjusted to block all airflow through the grille.

8. The method of claim 1 wherein step (a) is further defined by the engine load being idle and the temperature condition for the engine cooling loop being below a predetermined temperature range for the engine cooling loop, and wherein step (c) is defined by adjusting the grille airflow shutters to block substantially all airflow through the grille.

9. The method of claim 1 wherein step (a) is further defined by the temperature condition for the engine cooling loop being below a predetermined temperature range for the engine cooling loop, and another detected vehicle operating condition being a temperature condition for a transmission cooling loop that is below a predetermined temperature range for the transmission cooling loop, and wherein step (c) is defined by adjusting the grille airflow shutters to block substantially all airflow through the grille.

10. The method of claim 1 wherein step (a) is further defined by the detected vehicle operating conditions including a temperature condition for a charge air cooler, and step (c) is further defined by the grille airflow shutters selectively blocking airflow through the charge air cooler.

11. A method of powertrain thermal control in a vehicle having upper grille airflow shutters and lower grille airflow shutters, the method comprising the steps of:
(a) detecting vehicle operating conditions including at least a temperature condition for an engine cooling loop and engine load;
(b) pumping engine coolant through the engine cooling loop including pumping the engine coolant through a radiator under all temperature conditions of the engine cooling loop; and
(c) adjusting the lower grille airflow shutters relative to a lower grille to selectively block a portion, none or all airflow through the lower grille to thereby control airflow through the radiator based upon the detected vehicle operating conditions;
(d) detecting if an air conditioning system is operating;
(e) if the air conditioning system is operating, actuating the upper grille airflow shutters to allow most or all airflow through an upper grille; and
(f) if the air conditioning system is not operating, actuating the upper grille airflow shutters to block most or all airflow through the upper grille.

12. The method of claim 11 wherein step (a) is further defined by the detected vehicle operating conditions including a temperature condition for a transmission cooling loop, and step (c) is further defined by the lower grille airflow shutters selectively blocking airflow through a transmission oil cooler.

13. The method of claim 11 wherein step (b) is further defined by controlling a rate of flow pumped through the engine cooling loop by employing pulse control of an engine coolant pump.

14. The method of claim 11 including step (g) ceasing operation of an engine fan if the upper and lower grille airflow shutters are adjusted to block all airflow through the upper and lower grilles.

* * * * *